(12) United States Patent
Koh

(10) Patent No.: US 7,604,986 B2
(45) Date of Patent: Oct. 20, 2009

(54) DECOMPOSITION DEVICE OF ORGANIC WASTE AND AUTOMATIC CLEANING SYSTEM THEREOF

(76) Inventor: Chun-Il Koh, 792-11 Bangbaebon-dong, Seocho-gu, 137-830 Seoul (KR)

( * ) Notice: Subject to any disclaimer, the term of this patent is extended or adjusted under 35 U.S.C. 154(b) by 858 days.

(21) Appl. No.: 10/501,014

(22) PCT Filed: Jan. 9, 2003

(86) PCT No.: PCT/KR03/00035

§ 371 (c)(1),
(2), (4) Date: Mar. 14, 2005

(87) PCT Pub. No.: WO03/057381

PCT Pub. Date: Jul. 17, 2003

(65) Prior Publication Data

US 2005/0155918 A1    Jul. 21, 2005

(30) Foreign Application Priority Data

Jan. 12, 2002 (KR) .................. 10-2002-0001929
Jul. 5, 2002 (KR) .................. 10-2002-0038962
Jul. 26, 2002 (KR) .................. 10-2002-0044285

(51) Int. Cl.
*C12M 1/02* (2006.01)
*C12M 1/10* (2006.01)

(52) U.S. Cl. .................................... 435/290.2
(58) Field of Classification Search ............ 435/290.2
See application file for complete search history.

(56) References Cited

U.S. PATENT DOCUMENTS

| 2,225,428 | A | * | 12/1940 | Christensen | ............... 426/624 |
| 4,985,060 | A | * | 1/1991 | Higa | ............................... 71/6 |
| 5,615,627 | A | * | 4/1997 | Marr, Jr. | ..................... 110/346 |
| 2003/0108842 | A1 | * | 6/2003 | Ramirez-Tobias et al. | ..... 432/15 |

FOREIGN PATENT DOCUMENTS

| EP | 860407 A2 * 8/1998 |
| JP | 2000233166 * 8/2000 |

* cited by examiner

*Primary Examiner*—Walter D Griffin
*Assistant Examiner*—Lydia Edwards
(74) *Attorney, Agent, or Firm*—Schmeiser, Olsen & Watts LLP

(57) ABSTRACT

An organic waste decomposition device comprises a base frame (110), a cylindrical shell casing (120), a shaft (130) which is rotatably installed in the shell casing, a plurality of arm blades (140) which Are engaged to the shaft, a driving motor (150) adapted to provide a rotational force to the shaft, a ring blower (160) which is adapted to supply air into the interior of the shell casing, an air pipe (170) which is adapted to connect the ring blower and a lower portion of the shell casing, a pre-heater (180) which is adapted to pre-heat the air supplied into the interior of the shell casing, a condenser (190) which liquidefies the discharged vapor, a steam pipe (200) which connects an upper portion of the shell casing and the condenser, and a control box (210).

4 Claims, 8 Drawing Sheets

DECOMPOSITION DEVICE OF ORGANIC WASTE AND AUTOMATIC CLEANING SYSTEM THEREOF

BACKGROUND OF THE INVENTION

1. Field of the Invention

The present invention relates to an organic waste decomposition device, and in particular a decomposition device of an organic waste and an automatic cleaning system thereof which are capable of eliminating and decomposing an organic waste using a microorganism at a high speed.

2. Description of the Background Art

Generally, since an organic waste such as a food waste, etc. has a lot amount of animal/vegetable fiber, protein, carbohydrate, calcium, moisture, etc., in the case that such waste is buried without decomposing the same, a certain extract from the organic waste may be flown into a underground water and water source for thereby polluting environment.

In order to overcome the above problems, recently a method for decomposing and eliminating an organic waste including a food waste using a microorganism is introduced. For example, "a fermentation apparatus of an organic solid waste" is cited in the Japanese Utility model laid-open No. 55-8302, the Japanese Utility model laid-open No. 55-33004, the Japanese Utility model laid-open No. 3-34030, the Japanese Utility model laid-open No. 3-45936, the Japanese Utility model laid-open No. 4-45589, and the Japanese Utility model laid-open No. 6-42935. In addition, "a method and apparatus for utilizing a food waste or organic waste as a fertilizer or feed" is cited in the Korean Utility model laid-open No. 94-12627, the Korean Utility model laid-open No. 94-12628, the Korean Utility model laid-open No. 94-20714, the Korean Utility model laid-open No. 96-4300, the Korean Utility model laid-open No. 95-7395, the Korean Utility model laid-open No. 95-24804, the Japanese Utility model laid-open No. 59-33735, and the Japanese Utility model laid-open No. 63-162843. In addition, "apparatus for carbonizing an organic waste" is cited in the Japanese Patent laid-open No. 8-132008. "An apparatus for treating a waste including food waste" is cited in the Japanese Patent laid-open No. 8-132004, the Japanese Patent laid-open No. 8-57458, and the Japanese Patent laid-open No. 8-57459.

However, in the above conventional methods and apparatuses, it is slightly possible to decrease the amount of an organic waste such as a food waste. However, the above conventional methods and apparatuses are adapted to directly ferment the wastes without crushing or smashing the same, therefore a large size treatment apparatus is required. In addition, since a reaction area is small, it takes a long time for decomposition. In the conventional art, the wastes may be wasted without treating the same properly. Since a very bad smell occurs due to a harmful gas such as ammonia, carbon dioxide, carbon monoxide, sulfurous gas, sulfuration hydrogen, etc. which are generated when a microorganism reacts with an organic waste, there are problems for actually using the conventional methods and apparatuses at home, in school, public site, hospital, and etc.

In order to overcome the problems of bad smells which occur during an organic waste treatment, the Korean Patent laid-open No. 94-22660, the Korean Patent laid-open No. 94-24805, and the Korean Patent laid-open No. 95-30392 disclose "a deodorizing apparatus for an organic substance fermentation device and an organic substance fermentation device including a deodorizing apparatus", respectively.

However, the above conventional apparatuses are capable of only slightly decreasing a bad smell, but the bad smell still occurs when the organic waste is decomposed. Therefore, it is impossible to basically overcome the problems of bad smells which occur during the organic waste decomposition. In addition, in the conventional organic waste decomposition device, the water which is finally discharged to the outside of the device may not have any problems to be directly discharged to stream in a view of BOD. However, in this case, the conventional organic waste decomposition device does not have a drainage filtering unit, so that a certain sludge may be contained in the drainage water. Therefore, the conventional organic waste decomposition device may not be adapted to the region where requires a higher standard of BOD such as a source water preservation region.

In addition, in the conventional organic waste decomposition device, a worker directly enters in a fermentation tank for processing a remaining sludge using shovel after the organic waste is decomposed, there are much inconveniences for processing the remaining sludge.

Furthermore, in the conventional organic waste decomposition device, since the remaining sludge is processed manually, a lot of sludge may remain after the process is completed, so that the decomposition efficiency of the organic waste is decreased, and it takes a long time for the decomposition of the organic waste.

In the conventional organic waste decomposition device, the microorganism used for the organic waste decomposition is not recycled, so that a cost is increased based on a re-supply of the microorganism, and it is difficult to effectively manage due to an increased work load.

SUMMARY OF THE INVENTION

Accordingly, it is an object of the present invention to provide a decomposition device of an organic waste and an automatic cleaning system thereof which overcome the problems encountered in a conventional rearview mirror.

It is another object of the present invention to provide an organic waste decomposition device which is capable of effectively preventing a bad smell, implementing a high speed decomposition and which does not need a secondary process with respect to a remaining waste such as sludge.

It is further another object of the present invention to provide an organic waste decomposition device which is designed to be small and simple in its structure and is capable of implementing an easier operation and maintenance.

It is still further another object of the present invention to provide an organic waste decomposition device which is capable of effectively eliminating a sludge remaining in a drainage water and decreasing BOD of a drainage water.

It is still further another object of the present invention to provide an organic waste decomposition device having a drainage purification function based on a compact size and structure.

It is still further another object of the present invention to provide an automatic cleaning system for an organic waste decomposition device which is capable of automatically processing a remaining substance after an organic waste decomposition is completed.

It is still further another object of the present invention to provide an automatic cleaning system for an organic waste decomposition device which is capable of implementing an easier and simple management and decreasing a cost by recycling microorganism which is used for an organic waste decomposition operation.

To achieve the above objects, there is provided an organic waste decomposition device which comprises a plate shaped base arm, a cylindrical shell casing which is installed in the base frame and receive a microorganism therein, a shaft which is rotatably installed in a center portion of the shell casing, a plurality of arm blades which are engaged to the shaft and are adapted to agitate and crush the organic wastes, a driving motor which is adapted to provide a rotational force to the shaft, a ring blower which is adapted to supply air into the interior of the shell casing, an air pipe which is adapted to connect the ring blower and a lower portion of the shell casing, a pre-heater which is installed in the air pipe and is adapted to pre-heat the air supplied into the interior of the shell casing, a condenser which is adapted to liquefy a vapor discharged when an organic waste is decomposed in the interior of the shell casing and to discharge the liquefied vapor, a steam pipe which is adapted to connect an upper portion of the shell casing and the condenser, and a control box which is adapted to control the operations of the driving motor, ring blower and pre-heater.

To achieve the above objects, there is provided an organic waste decomposition device which comprises a fermentation tank which includes an agitator capable of cutting an inputted organic waste and is adapted to decomposes the organic wastes using an added microorganism bacteria and discharges a carbonic acid gas including water, a cooling tank which is adapted to cool a carbonic acid gas including water which occurs in the fermentation tank, separates the same into water and a carbonic acid gas and discharges through an outlet pipe, a gas-liquid separator which is adapted to separate water and a carbonic acid gas flown in through the outlet pipe and to discharge the water through a first drainage pipe formed in a lower portion, and in which the carbonic acid gas returns to the fermentation tank through the exhaust pipe formed in an upper potion, and a solid-liquid separator which is installed in the interior of the cooling tank and is adapted to filter a sludge from the water flown in through the first exhaust pipe and discharge through a second exhaust pipe connected to an outlet.

To achieve the above objects, there is provided an automatic cleaning system of an organic waste decomposition device which comprises a hopper which is connected with a fermentation tank of an organic waste decomposition device using a suction line and is adapted to suck a remaining substance from the fermentation tank and store the same, a twist screen which is adapted to filter a remaining substance supplied from the hopper and separates the same into a recyclable substance and a non-recyclable substance and discharge the same, an eject hopper which is adapted to store a recyclable substance separated and discharged from the twist screen, a cyclone which is connected with the eject hopper by a pressure line and is adapted to re-supply a recyclable substance supplied from the eject holler to a fermentation tank of an organic waste decomposition device and to return a part of the same to the hopper, and a ring blower which is adapted to suck air from the hopper for thereby implementing a decreased pressure stare in the interior of the hopper and to generate a certain air pressure for transferring a recyclable substance from the eject hopper to the cyclone.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
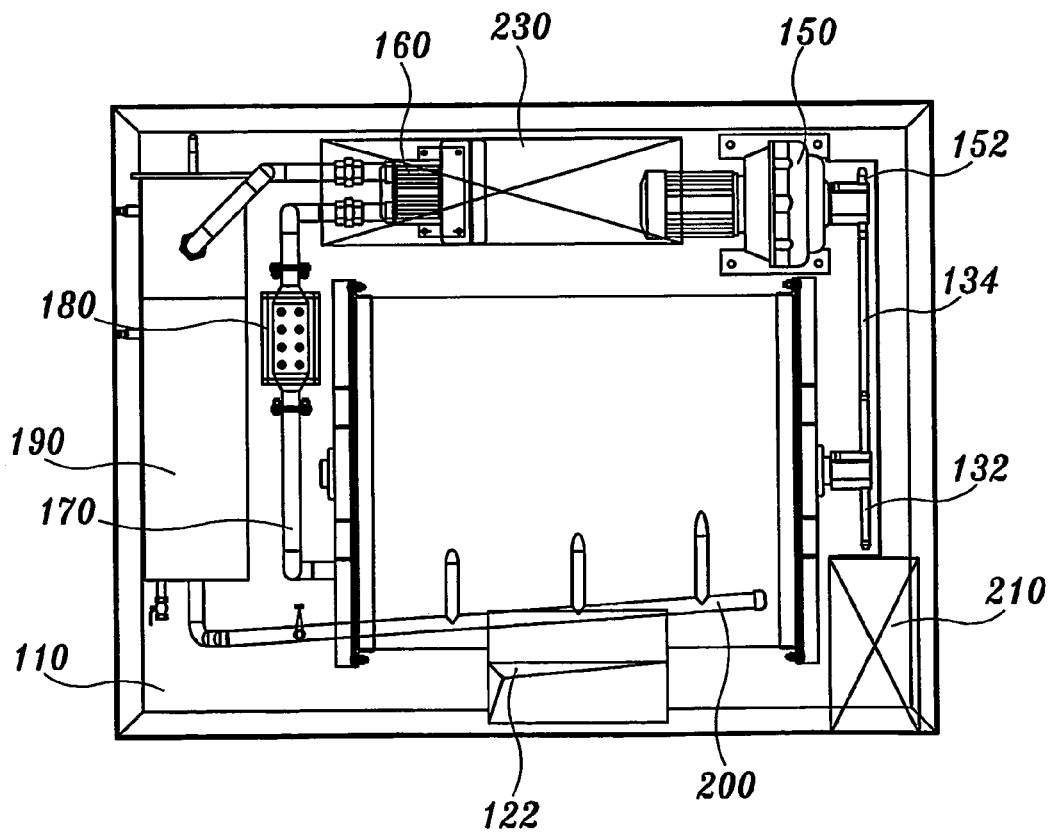
FIG. 1 is a plan view illustrating an organic waste decomposition device according to a first embodiment of the present invention.
Figure 2:
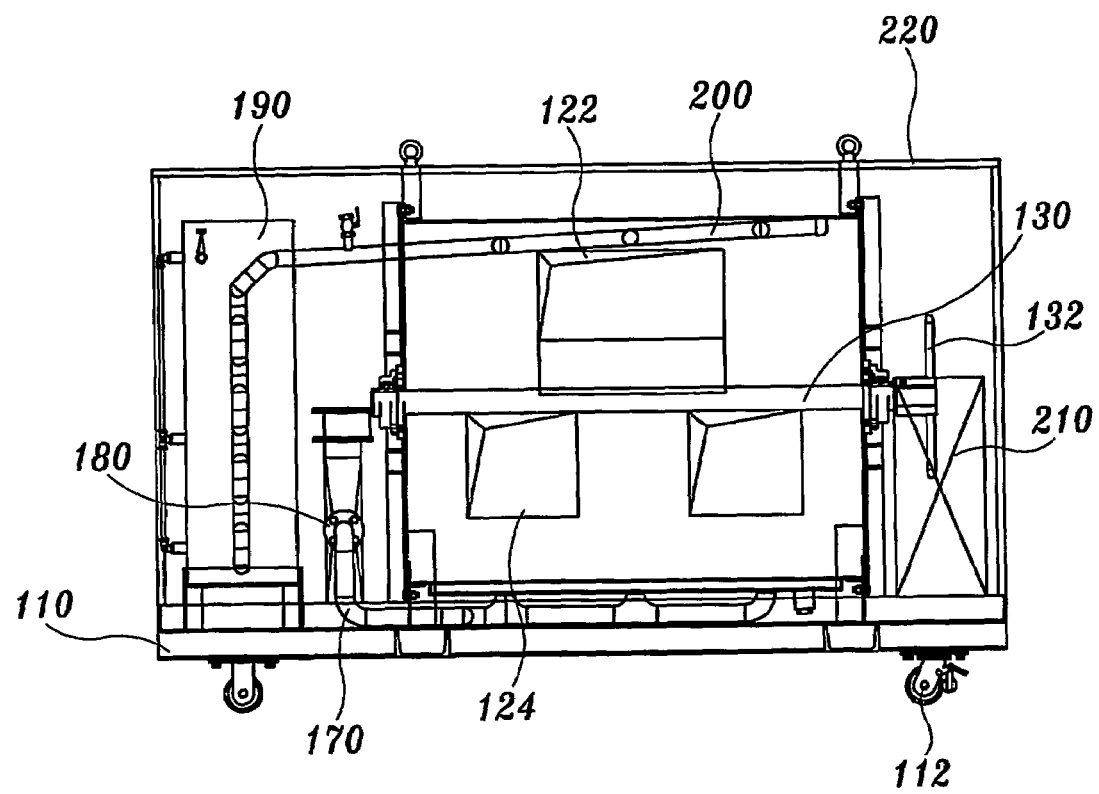
FIG. 2 is a front view illustrating an organic waste decomposition device according to a first embodiment of the present invention.
Figure 3:
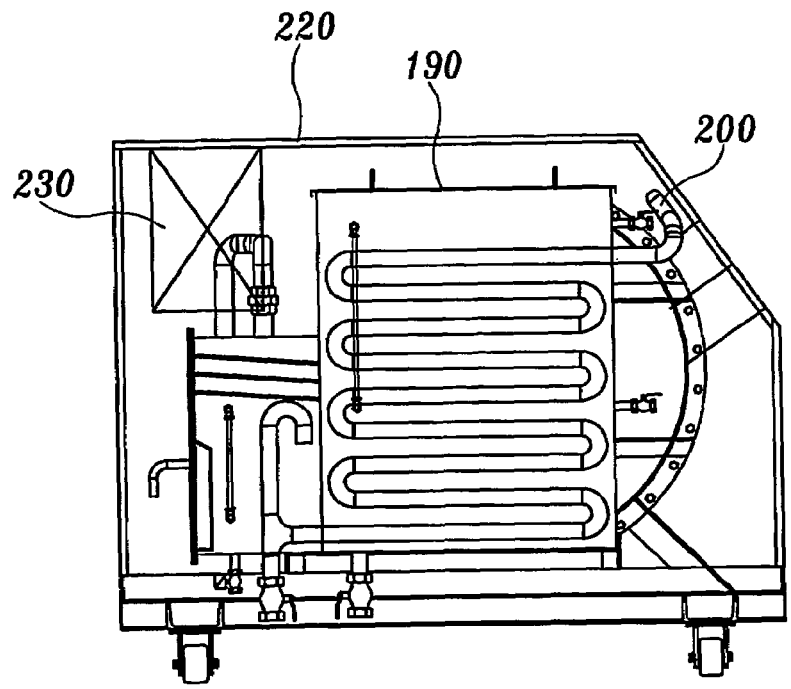
FIG. 3 is a left side view illustrating an organic waste decomposition device according to a first embodiment of the present invention.
Figure 4:
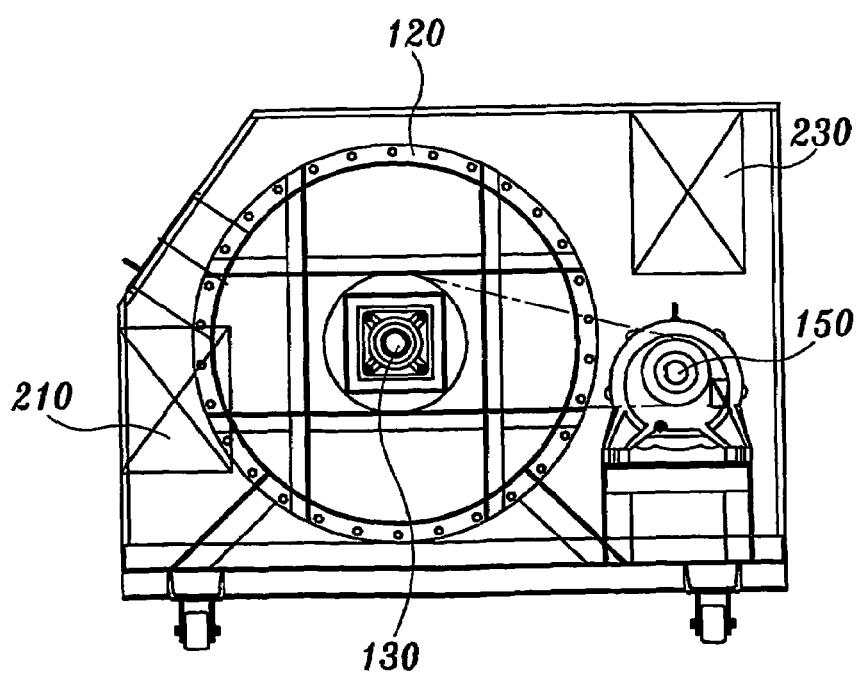
FIG. 4 is a right side view illustrating an organic waste decomposition device according to a first embodiment of the present invention.
Figure 5:
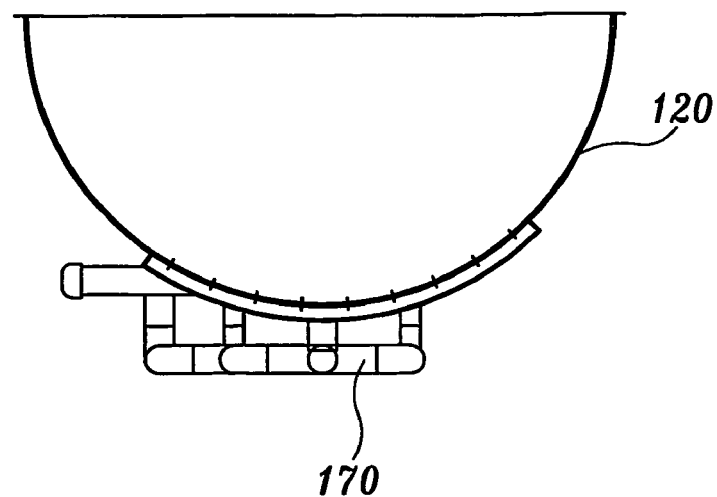
FIG. 5 is a view illustrating a lower construction of a shell casing of an organic waste decomposition device according to a first embodiment of the present invention.
Figure 6:
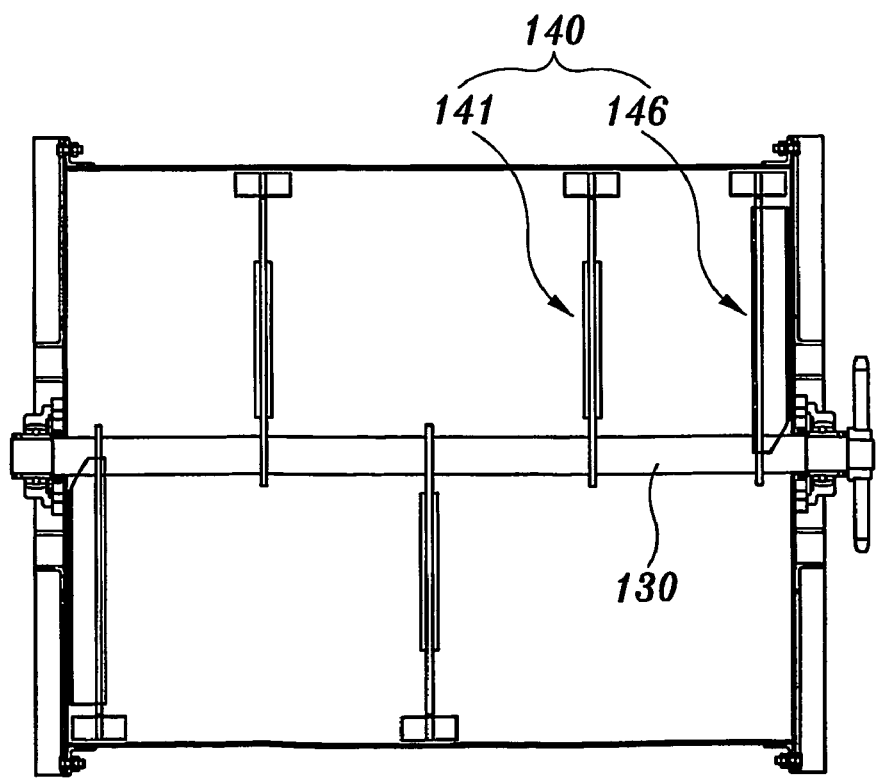
FIG. 6 is a plan view illustrating an inner construction of a shell casing of an organic waste decomposition device according to a first embodiment of the present invention.
Figure 7:
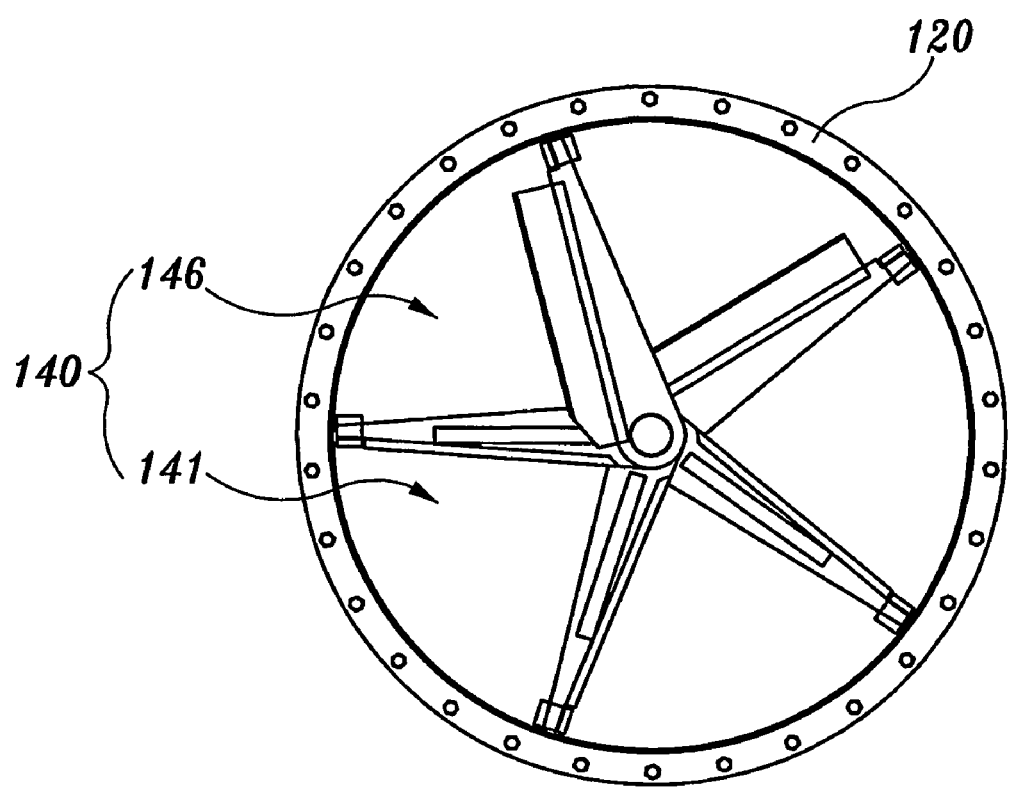
FIG. 7 is a side view illustrating an inner construction of a shell casing of an organic waste decomposition device according to the present invention.
Figure 8:
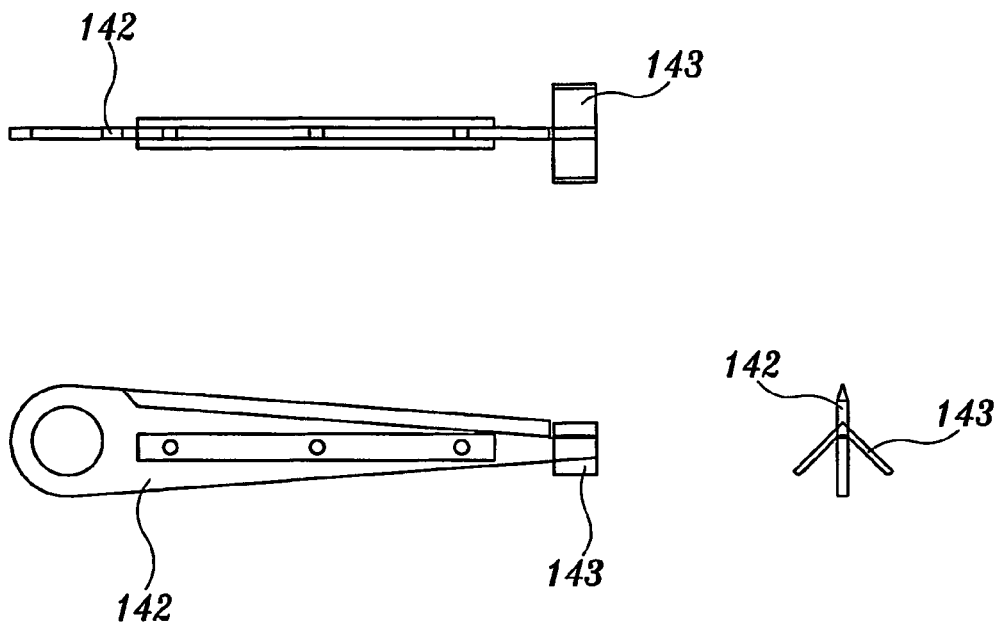
FIG. 8 is a view illustrating of an inner arm blade of an organic waste decomposition device according to a first embodiment of the present invention.
Figure 9:
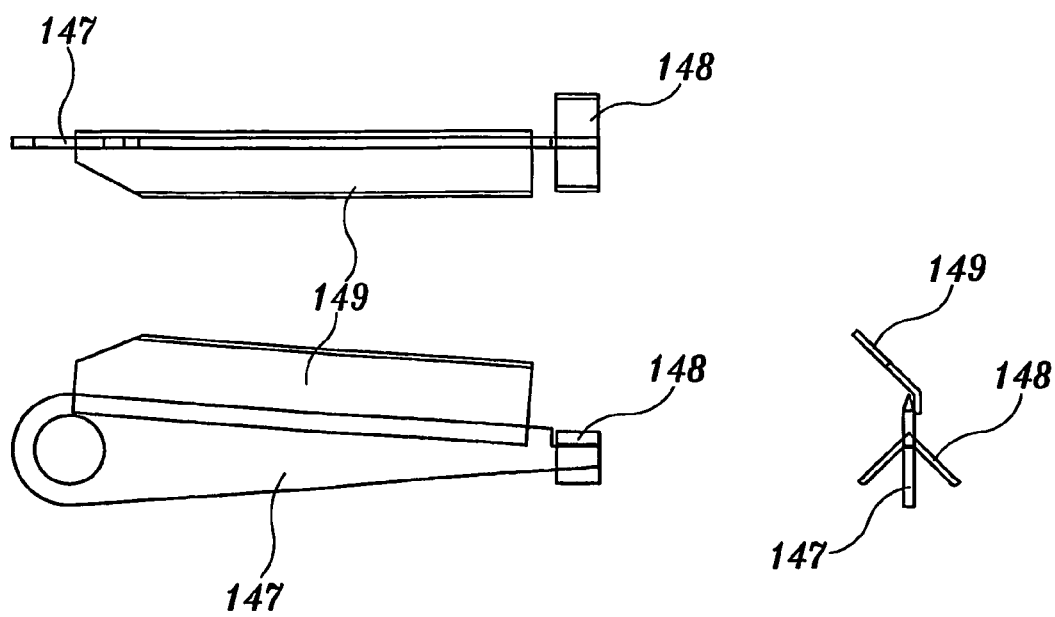
FIG. 9 is a view illustrating an outer arm blade of an organic waste decomposition device according to a first embodiment of the present invention.

The preferred embodiments of the present invention will be described with reference to the accompanying drawings. The detailed descriptions concerning the known art or its construction will be omitted in the case that it is judged that its descriptions may not distinctively point out the subjects of the present invention. FIG. 1 is a plan view illustrating an organic waste decomposition device according to a first embodiment of the present invention, FIG. 2 is a front view illustrating an organic waste decomposition device according to a first embodiment of the present invention, FIG. 3 is a left side view illustrating an organic waste decomposition device according to a first embodiment of the present invention, FIG. 4 is a right side view illustrating an organic waste decomposition device according to a first embodiment of the present invention, FIG. 5 is a view illustrating a lower construction of a shell casing of an organic waste decomposition device according to a first embodiment of the present invention, FIG. 6 is a plan view illustrating an inner construction of a shell casing of an organic waste decomposition device according to a first embodiment of the present invention, FIG. 7 is a side view illustrating an inner construction of a shell casing of an organic waste decomposition device according to the present invention, FIG. 8 is a view illustrating of an inner arm blade of an organic waste decomposition device according to a first embodiment of the present invention, and FIG. 9 is a view illustrating an outer arm blade of an organic waste decomposition device according to a first embodiment of the present invention;

As shown in FIGS. 1 through 6, an organic waste decomposition device according to a first embodiment of the present invention includes a base frame 110, a shell casing 120, a shaft 130, an arm blade 140, a driving motor 150, a ring blower 160, an air pipe 170, a pre-heater 180, a condenser 190, a steam pipe 200, and a control box 210. There are further provided a cover 220 and a chiller 230.

The base frame 110 is formed of a rectangular plate and is adapted to support all elements including the shell casing 120. The base frame 110 includes a caster 112 in each corner of the back surface of the same. The caster 112 is a rotation member which is adapted to move the organic waste decomposition device 1000 according to the present invention.

The shell casing 120 is a cylindrical structure in which an organic waste decomposition occurs by microorganism. *actinomyces bovis* which is a kind of special microorganism is inputted into the interior of the shell casing 120 for thereby decomposing an organic waste. The *actinomyces bovis* is a microorganism which is used for decomposing the organic waste and reproduces waste and carbonic acid gas when an organic waste is decomposed. The shell casing 20 includes an input door 122 and a discharge door 124.

The shaft 130 is a shaft member which is adapted to be rotatable at a center portion of the shell casing 120. A shaft gear 132 is engaged to an end portion of the shaft 130. A chain 134 is connected between the shaft gear 132 and a motor gear 152 of the driving motor 150 for thereby transferring a driving force thereto.

The arm blade 140 is formed of a plurality of agitating/crushing members connected to an outer circumferential surface of the shaft 130 for thereby agitating and crushing an organic waste inputted into the shell casing. The arm blade 140 is formed of a plurality of inner arm blades 141 installed at a regular interval with respect to the axial direction of the shaft, and an outer arm blade 146 which is installed at both ends of the shaft. The inner arm blade 141 is formed of an inner arm plate 142 having an end engaged to the shaft, and an inner end plate 143 which is engaged to the other end of the inner arm plate and has a bent cent. The outer arm blade 146 is formed of an outer arm plate 147 which has an end engaged to the shaft, an outer end plate 148 which is engaged to the other end of the outer arm plate and has a bent center portion, and a sub-plate 149 which is engaged to an upper portion of the outer arm plate at a certain slanted angle.

The driving motor 150 is a unit for providing a rotational force to the shaft 130 when a riving voltage is applied. The shaft 130 is rotated based on the driving of the driving motor 150. At this time, a plurality of the arm blades 140 installed in an outer circumferential surface of the shaft 130 agitate and mix the organic wastes and microorganism in the shell casing 120.

The ring blower 160 is a unit for supplying air into the interior of the shell casing 120. The microorganism used for an organic waste decomposition is aerotropic bacteria, so that air is needed to be continuously supplied when the organic wastes are decomposed. The ring blower 160 is adapted to continuously supplying air into the interior of the shell casing 120 in stable manner.

The air pipe 170 is a pipe member which connects the ring blower 160 and a lower portion of the shell casing 120. The air pipe 170 operates as a passage through which the air generated by the ring blower 160 flows to the shell casing 120.

The pre-heater 180 is installed in the air pipe 170 and a unit for pre-heating air supplied into the interior of the shell casing 120. The pre-heater 180 is adapted to supply air which is heated to a certain temperature at which the *actinomyces bovis* properly decomposes an organic waste, into the interior of the shell casing 120, so that it is possible to increase a decomposition efficiency of the organic waste and decrease time required for the decomposition.

The condenser 190 is a unit for liquefying vapor discharged when the organic waste is decomposed in the interior of the shell casing 120.

The steam pipe 200 is a pipe member which connects an upper portion of the shell casing 120 and the condenser 190. The steam pipe 200 is adapted to operate as a passage through which the vapor generated when the organic waste is decomposed in the interior of the shell casing flows to the condenser 190.

The control box 210 is a unit for controlling the operations of the driving motor 150, the ring blower 160 and the pre-heater 180. The control box 210 controls the driving time and operation intervals of the driving motor 150, the ring blower 160, and the pre-heater 180 based on a user's selection or a previously set mode. The control box 210 is formed of a mode selection switch, a ring blower switch and a driving motor switch.

The cover 220 is a structure for protecting all elements including the shell casing 120.

The chiller 230 is a cooling unit for adjusting the temperature of the interior of the shell casing 120. The chiller 230 is adapted to supply air into the interior of the shell casing for thereby decreasing the temperature when the temperature of is the interior of the same is a previously set temperature or a previously set time.

In addition, the operation and operation modes of the organic waste decomposition device according to a first embodiment of the present invention will be described. The organic waste decomposition operation mode using an organic waste decomposition device according to the present invention may be classified into a manual operation mode and an automatic operation mode.

(1) Manual Operation Mode

The mode selection switch of the control box is set to a manual mode. The input door is opened, and an organic waste is inputted into the interior of the shell casing. Thereafter, the ring blower switch and driving motor switch of the control box are turned on, so that the shaft/arm blades are rotated based on an air supply operation of the ring blower and the driving motor. The microorganism and organic waste are well agitated, and the agitating operation is performed for 3 through 5 minutes.

(2) Automatic Operation Mode

When the manual operation mode is completed, the input door is closed, and the mode selection switch is set to the automatic mode. Thereafter, when a set time is passed, the ring blower and driving motor are driven. When a set time is passed, the chiller operates, and the driving motor stops. The system is agitated and idled for 3 through 5 hours, and then the driving motor is operated again. At this time, the agitating and idle operation by the driving motor are performed 24 hours 5 through 8 times. Thereafter, after 24 hours are passed, all power are disconnected.

Figure 10:
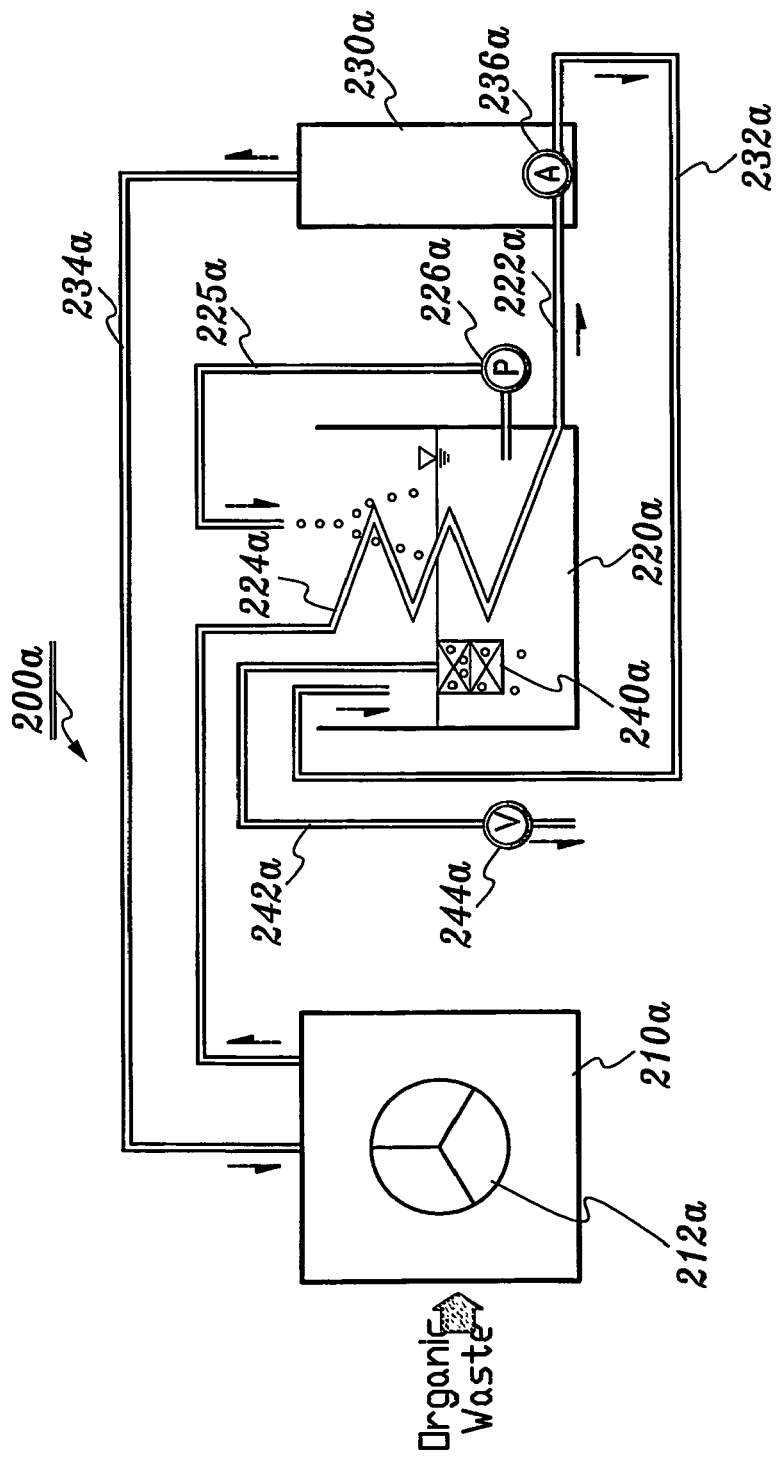
FIG. 10 is a view illustrating the construction of an organic waste decomposition device according to a second embodiment of the present invention.

FIG. 10 is a view illustrating the construction of an organic waste decomposition device according to a second embodiment of the present invention. As shown therein, the organic waste decomposition device 200a according to a second embodiment of the present invention includes a fermentation tank 210a, a cooling tank 220a, a gas-liquid separator 230a, and a solid-liquid separator 240a.

(1) Fermentation Tank

The fermentation tank 210a is a fermentation/decomposition unit for cutting an organic waste in small and then adding a microorganism bacteria therein for thereby fermenting an organic waste.

The fermentation tank 210a includes an agitator 212a for cutting the inputted organic wastes and is adapted to decompose the organic wastes using the added microorganism bacteria and discharge a carbonic acid gas including water to the cooling tank 220a. At this time, a special microorganism bacteria such as *actinomyces bovis* is added as a microorganism bacteria which is used for fermenting the added organic wastes. The *actinomyces bovis* has a fermentation speed 40 to 60 times compared to the common microorganism and is capable of decomposing an organic waste at a temperature higher than 40 to 60° C.

(2) Cooling Tank

The cooling tank 220a is a unit which is capable of cooling a carbonic acid gas including water discharged from the fermentation tank 210a and separating the same into water and a carbonic acid gas.

The cooling tank 220a includes a bent pipe 224a having an outer circumferential surface contacting with a cooling water. The carbonic acid gas including water flows through the bent pipe 224a and is cooled and flown to the outside through an outlet pipe 222a. In addition, the cooling tank 220a includes a circulation pipe 225a which connects the upper and lower portions. The cooling water circulates by a pump 226a installed in the circulation pipe 225a.

A microorganism bacteria is inputted into the cooling tank 220a separately from the fermentation tank 210a. The above organism bacteria is used to decompose the organic waste remaining in the water discharged from the gas-liquid separator 230a in a state that the same remains in an aeration state in the gas-liquid separator 230a.

(3) Gas-Liquid Separator

The gas-liquid separator 230a is a unit capable of separating a carbonic acid gas including water into water which is liquid and a gas.

The gas-liquid separator 230a is adapted to separate water and carbonic acid gas which are flown in through the outlet pipe 222a. The separated water is discharged through a first drainage pipe 232a formed in a lower potion, and the carbonic acid gas returns to the fermentation tank 210a through an exhaust pipe 234a formed in an upper portion.

The gas-liquid separator 230a includes an air inlet pipe 236a. The air inlet pipe 236a is adapted to aerate water flown through the outlet pipe 222a. Here, the aeration is directed to increasing oxygen in water by blowing air into water. When an aerotropic microorganism is added into the aerated water, the microorganism is dynamically activated for thereby expediting an organic waste decomposition.

with a second drainage pipe 242a. The second drainage pipe 242a includes a drainage control valve 244a.

As the solid-liquid separator 240a, a filter formed of a hollow fiber film may be used. The diameters of the holes formed in the filter may be below 0.1~0.4 μm for quickly filtering a fine sludge included in water.

The organic waste decomposition implemented by the organic waste decomposition device and a drainage process according to a second embodiment of the present invention will be described.

The organic wastes inputted into the fermentation tank 210a are cut and agitated by the agitator 212a. At the same time, the organic wastes are fermented and decomposed by a microorganism added in the fermentation tank 210a. At this time, a carbonic acid gas including water which occurs during the organic waste decomposition is discharged from the fermentation tank 210a and flows through the bent pipe 224a of the cooling tank 220a and is discharged to the gas-liquid separator 230a in a cooled state and is separated into a carbonic acid gas and water by the gas-liquid separator 230a.

The separated carbonic acid gas returns to the fermentation tank 210a through the exhaust pipe 234a, and the separated water is discharged to the cooling tank 220a through the first drainage pipe 232a in an aerated state by the air inlet pipe 236a. Thereafter, the water which is first discharged from the cooling tank 220a is added with a microorganism bacteria, so that an organic waste remaining in water is decomposed, and at the same time passes through the solid-liquid separator 240a and is finally discharged to the outside of the apparatus through the second drainage pipe 242a in a state that a sludge remaining therein is fully filtered.

EXPERIMENT EXAMPLE

A food waste of 100 kg produced in a cooking site of a certain restaurant was inputted into an organic waste decomposition device and was processed for 24 hours according to a second embodiment of the present invention for a comparison with the conventional art. As a result of the above process, a result was obtained as seen in Table 1. As seen in Table 1, the organic waste decomposition device according to a second embodiment of the present invention produced a small amount of waste water compared to the conventional organic waste decomposition device and had a much lower BOD value of the waste water.

TABLE 1

|  | Condition of Decomposition | | | Result of Decomposition | | |
| --- | --- | --- | --- | --- | --- | --- |
|  | Amount of microorganism | Water source | pH | Time of Decomposition (hr) | Final amount of waste water | BOD value |
| Present Invention | MLSS 10000 mg/l | 1000 mg/l | 4.5 | 24 | 55 l | 2 PPM |
| Prior art | MLSS 8000 mg/l | 1000 mg/l | 4.5 | 24 | 64 l | 5 PPM |

(4) Solid-Liquid Separator

The solid-liquid separator 240a is a unit capable of filtering sludge from the aerated water flown in through the first drainage pipe 232a. Here, the sludge represents a remaining impurity substances.

The solid-liquid separator 240a is installed in the interior of the cooling tank 240a and includes an outlet connected (Here, MLSS represents Mixed Liquid Suspender Solid, namely, a concentration of microorganism)

Figure 11:
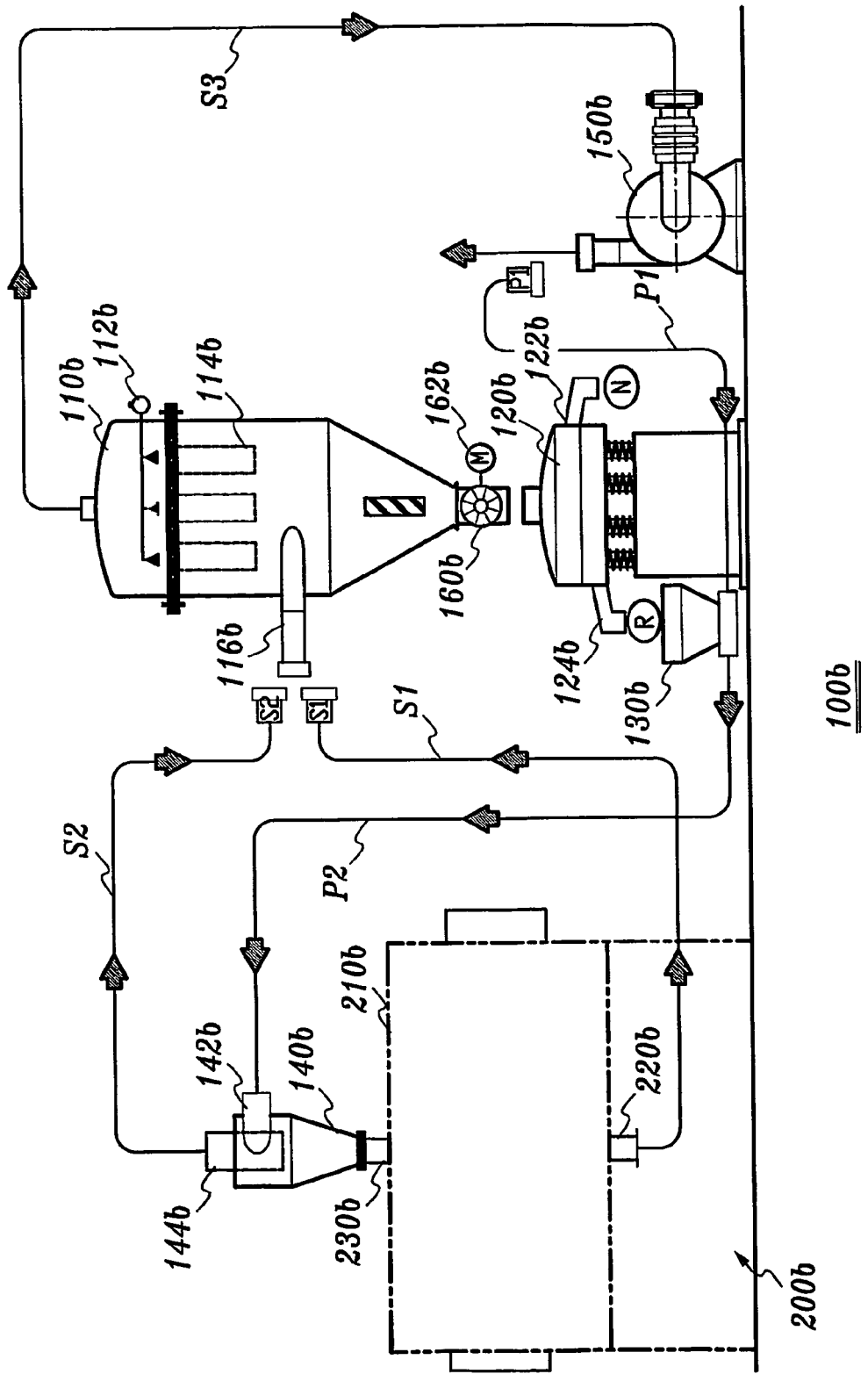
FIG. 11 is a view illustrating the construction of an automatic cleaning system of an organic waste decomposition device according to an embodiment of the present invention.

FIG. 11 is a view illustrating an automatic cleaning system of an organic waste decomposition device according to the present invention. As shown therein, the automatic cleaning system 100b of the organic waste decomposition device according to the present invention includes a hopper 110b, a twist screen 120b, an eject hopper 130b, a cyclone 140b, a ring blower 150b, and a rotary valve 160b.

(1) Hopper

The hopper 110b is a unit for sucking a remaining substance from the organic waste decomposition unit 200b and storing the same. The hopper 110b is connected with a key coupler 220b installed in the fermentation tank 210b of the organic waste decomposition tank 200b and a suction line S1.

The hopper 110b includes a coupler 116b installed in one side of the same. The coupler 116b is coupled with a one-touch joint installed in an end portion of the suction lines S1, S2.

In addition, the hopper 110b includes an air supplier 112b which is capable of pushing a remaining substance, downwardly, sucked in the hopper 110b, and a plurality of filter bags 114b which are adapted to eliminate a foreign substance from the air supplied from the air supplier 112b.

(2) Twist Screen

The twist screen 120b is a unit capable of filtering a remaining substances discharged from the hopper 110b and separating the same into a recyclable substance R and a non-recyclable substance N.

The twist screen 120b includes a multi-step screen and a vibrator motor. The twist screen 120b is adapted to filter a remaining substance by the size using a vibration generated by the vibrator motor.

The twist screen 120b includes a non-recyclable substance outlet 122b in an upper portion of the same, and a recyclable substance outlet 124b in a lower portion of the same.

(3) Eject Hopper

The eject hopper 130b is a unit capable of temporarily storing a recyclable substance separated and discharged from the twist screen 120b.

The eject hopper 130b is connected with the ring blower 150b and a cyclone 140b by pressure lines P1 and P2 and is adapted to transfer a recyclable substance to the cyclone 140b by an air force supplied from the ring blower 150b.

(4) Cyclone

The cyclone 140b is a unit capable of re-supplying a recyclable substance supplied from the eject hopper 130 to the fermentation tank 210b of the organic waste decomposition device 200b and returns a part of the same to the hopper 110b.

The cyclone 140b is engaged to a flange 230b installed in the fermentation tank 210b of the organic waste decomposition device 200b.

In addition, the cyclone 140b includes an inlet pipe 142b and an outlet pipe 144b. The inlet pipe 142b is connected with the eject hopper 130b by a pressure line P2, and the outlet pipe 144b is connected with the hopper 110 by the suction line S2.

(5) Ring Blower

The ring blower is a unit capable of sucking air from the hopper 110b, implementing a pressure decreased state in the hopper 110b and generating a certain air pressure which is adapted to transfer a recyclable substance from the eject hopper 130b to the cyclone 140b.

The ring blower 150b is connected with the hopper 110b by the suction line S3, and is connected with the eject hopper 130b by the pressure line P1.

(6) Rotary Valve

The rotary valve is a unit capable of adjusting the amount of a remaining substance supplied from the hopper 110b to the twist screen 120b.

The rotary valve 160b is installed in an outlet formed in a lower portion of the hopper 100b and includes a motor 162b for providing a rotation driving force.

The operations of the automatic cleaning system for an organic waste decomposition unit according to the present invention will be described.

When the decomposition of the organic wastes in the fermentation tank 210b of the organic waste decomposition tank 200b is completed, the foreign substances such as an organic waste decomposition waste including a microorganism is transferred to the hopper 110b through the key coupler 220b and the suction line S1.

Thereafter, the remaining substance transferred to the hopper 110b is downwardly moved by the air generated by the air supplier 112b, and the dame drops into the twist screen 120b by a certain amount based on an opened degree of the rotary valve 160b.

The remaining substance transferred to the twist screen 120b is separated into a non-recyclable substance N and a recyclable substance R based on the size of the particle, and the thusly separated substances are discharged to the recyclable substances outlet 122b and the recyclable substance outlet 124b, respectively.

The recyclable substance R discharged from the recyclable substance outlet 124b is temporarily stored in the eject hopper 130b and is transferred to the cyclone 140b through the pressure line P2 by an air pressure generated by the ring blower 150b. The recyclable substance R transferred to the cyclone 140b is re-supplied to the fermentation tank 210b of the organic waste decomposition device 200b through the flange 230b, and a part of the recyclable substance R is re-transferred to the hopper 110b through the outlet pipe 144b and the suction line S2.

As described above, in the organic waste decomposition device according to a first embodiment of the present invention, since an organic waste is fully decomposed by an *actinomyces bovis* which is a special microorganism in the shell casing, there is not a bad smell, and a remnant is not produced.

In the organic waste decomposition device according to a first embodiment of the present invention, since the pre-heater heats the air to a certain temperature proper to a dynamic activity of the *actinomyces bovis*, it is possible to implement a high speed elimination of the organic waste.

The organic waste decomposition device according to a first embodiment of the present invention is small-sized and has a simple construction, so that a management and maintenance are easy and simple.

In addition, in the organic waste decomposition device according to a second embodiment of the present invention, when discharging the final waste water, a sludge which still remains in the same is eliminated for thereby implementing a double purification, so that it is possible to prevent a second pollution due to the waste water, whereby there is a great effect for preventing an environment pollution and water source.

The organic waste decomposition device according to a second embodiment of the present invention has a small and compact size and further includes a drainage purification function, so that a fabrication and installation of the same are easier.

In the organic waste decomposition device according to a second embodiment of the present invention, since a first discharged water is recycled as a cooling water, so that it is possible to implement an extended cooling water supply time. Therefore, a management is easier.

In the automatic cleaning system of an organic waste decomposition device according to the present invention, the remaining substance is processed after the decomposition of the organic wastes is completed, so that a remaining substance decomposition work is easier, and a decomposition efficiency of the organic waste is enhanced, and it is possible to decrease time required for the decomposition.

In addition, in the automatic cleaning system of an organic waste decomposition device according to the present invention, since a microorganism used for an organic waste decomposition may be recycled, so that a microorganism re-supply period is extended for thereby decreasing a management work load and a management cost.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An automatic cleaning system of an organic waste decomposition device, comprising:
    a hopper which is connected with a fermentation tank of an organic waste decomposition device using a suction line and is adapted to suck a remaining substance from the fermentation tank and store the same;
    a twist screen having a multi-step screen and a vibrator motor which is adapted to filter a remaining substance supplied from the hopper using a vibration generated by the vibrator motor and separates the same into a recyclable substance and a non-recyclable substance and discharge the same;
    an eject hopper which is adapted to store a recyclable substance separated and discharged from the twist screen;
    a cyclone which is connected with the eject hopper by a pressure line and is adapted to re-supply a recyclable substance supplied from the eject hopper to a fermentation tank of an organic waste decomposition device and to return a part of the same to the hopper; and
    a ring blower which is adapted to suck air from the hopper for thereby implementing a decreased pressure stare in the interior of the hopper and to generate a certain air pressure for transferring a recyclable substance from the eject hopper to the cyclone.

2. The system of claim 1, wherein said hopper includes an air supplier adapted to supply air for downwardly moving a remaining substance sucked in the hopper.

3. The system of claim 2, wherein said hopper includes a filter bag capable of eliminating a foreign substance from the air supplied through the air supplier.

4. The system of claim 1, wherein said hopper includes a rotary valve which is installed in a lower portion of the hopper and is adapted to adjust the amount of a remaining substance supplied to the twist screen.

* * * * *